US012135069B2

(12) United States Patent
Nguyen et al.

(10) Patent No.: US 12,135,069 B2
(45) Date of Patent: Nov. 5, 2024

(54) BELLOWS SUSPENSION UNIT

(71) Applicant: RB Distribution, Inc., Colmar, PA (US)

(72) Inventors: Tam Van Nguyen, Philadelphia, PA (US); Matthew Robert May, Hatboro, PA (US); Sean Cattie, Perkasie, PA (US); Bryan McMasters, Telford, PA (US); David Cimbolo, Lake Harmony, PA (US)

(73) Assignee: RB Distribution, Inc., Colmar, PA (US)

( * ) Notice: Subject to any disclaimer, the term of this patent is extended or adjusted under 35 U.S.C. 154(b) by 64 days.

(21) Appl. No.: 17/825,443

(22) Filed: May 26, 2022

(65) Prior Publication Data

US 2023/0383813 A1 Nov. 30, 2023

(51) Int. Cl.
*F16F 13/00* (2006.01)
*F16F 9/04* (2006.01)
(52) U.S. Cl.
CPC .......... *F16F 13/002* (2013.01); *F16F 9/0409* (2013.01)
(58) Field of Classification Search
CPC .............................. F16F 13/002; F16F 9/0409
See application file for complete search history.

(56) References Cited

U.S. PATENT DOCUMENTS

| 1,029,496 | A | * | 6/1912 | Garlock | F04B 43/08 417/472 |
| 1,780,249 | A | * | 11/1930 | Spreen | F16J 15/36 277/366 |
| 3,895,787 | A | | 7/1975 | Niehus et al. | |
| 5,580,033 | A | | 12/1996 | Burkley et al. | |
| 6,398,198 | B1 | * | 6/2002 | Okamoto | B60G 17/0521 267/122 |
| 2007/0262500 | A1 | * | 11/2007 | Tubbs | F16F 1/08 267/166.1 |
| 2020/0238777 | A1 | | 7/2020 | Delorenzis et al. | |

FOREIGN PATENT DOCUMENTS

| CA | 2412336 A1 * | 5/2004 | ............ B60G 15/12 |
| CN | 104864017 A * | 8/2015 | ............ B60N 2/525 |
| CN | 109578491 A * | 4/2019 | ............ F16F 9/0409 |
| DE | 2525333 A * | 12/1976 | ............ B60G 11/58 |
| EP | 2404818 A1 * | 1/2012 | ............ B62K 25/04 |
| WO | WO-9707999 A1 * | 3/1997 | ............ B60G 11/56 |

* cited by examiner

*Primary Examiner* — Melody M Burch
(74) *Attorney, Agent, or Firm* — Volpe Koenig

(57) ABSTRACT

The auxiliary suspension device is relatively neutral at rest and responds in coordination with the existing suspension system upon application of a load. The redundant suspension device has an inflatable bellow that is mounted between a vehicle's frame and an existing vehicle suspension element.

22 Claims, 8 Drawing Sheets

BELLOWS SUSPENSION UNIT

FIELD OF INVENTION

The invention relates generally to fluid or pneumatic suspension devices. More specifically, the invention relates to a suspension device having an adjustable bellow. Most specifically, the invention relates to a suspension device having a coil spring encased in an adjustable bellow. Most specifically, the invention relates to a suspension device that is intended as a redundant suspension element that improves shock absorbency even when not inflated and improves handling and ride under heavier loads when inflated.

BACKGROUND

Many vehicles, particularly trailer towing vehicles and trucks, experience a level of fatigue in the suspension system. Suspension fatigue is often the result of normal wear or the result of repeatedly transporting loads that exceed the recommended load level. There have been prior attempts to add auxiliary load bearing elements to the suspension. In some cases, these attempts replaced the original shock absorbers with an inflatable bellows or with a spring around the shock absorber. In the case of leaf springs, there have been attempts to add an additional leaf to the original leaf array. These prior art attempt have not been totally satisfactory because they often changed the original suspension when it was not under a load or the auxiliary solution was not aligned with the original suspension.

SUMMARY

The present invention addresses the shortcoming of the prior art by providing a device that relatively neutral at rest and responds in coordination with the existing suspension system to the application of a load. The solution provides a vehicle with a redundant suspension device that mounts directly to the vehicle's frame at one end and mounts in alignment with the original suspension element at the other end. An auxiliary load bearing element fits between the mounted ends in a bellows with an inflatable inner chamber to add further suspension capacity under a load. The auxiliary load bearing element is dimension to be unloaded at rest, but respond to the application of a load. This provides an auxiliary suspension device that is general neutral at rest and is variable in accordance with applied loads.

DETAILED DESCRIPTION OF THE PREFERRED EMBODIMENTS

The invention is described below with reference to the above drawings wherein the numerals identify the same or similar elements in all views.

Figure 1:
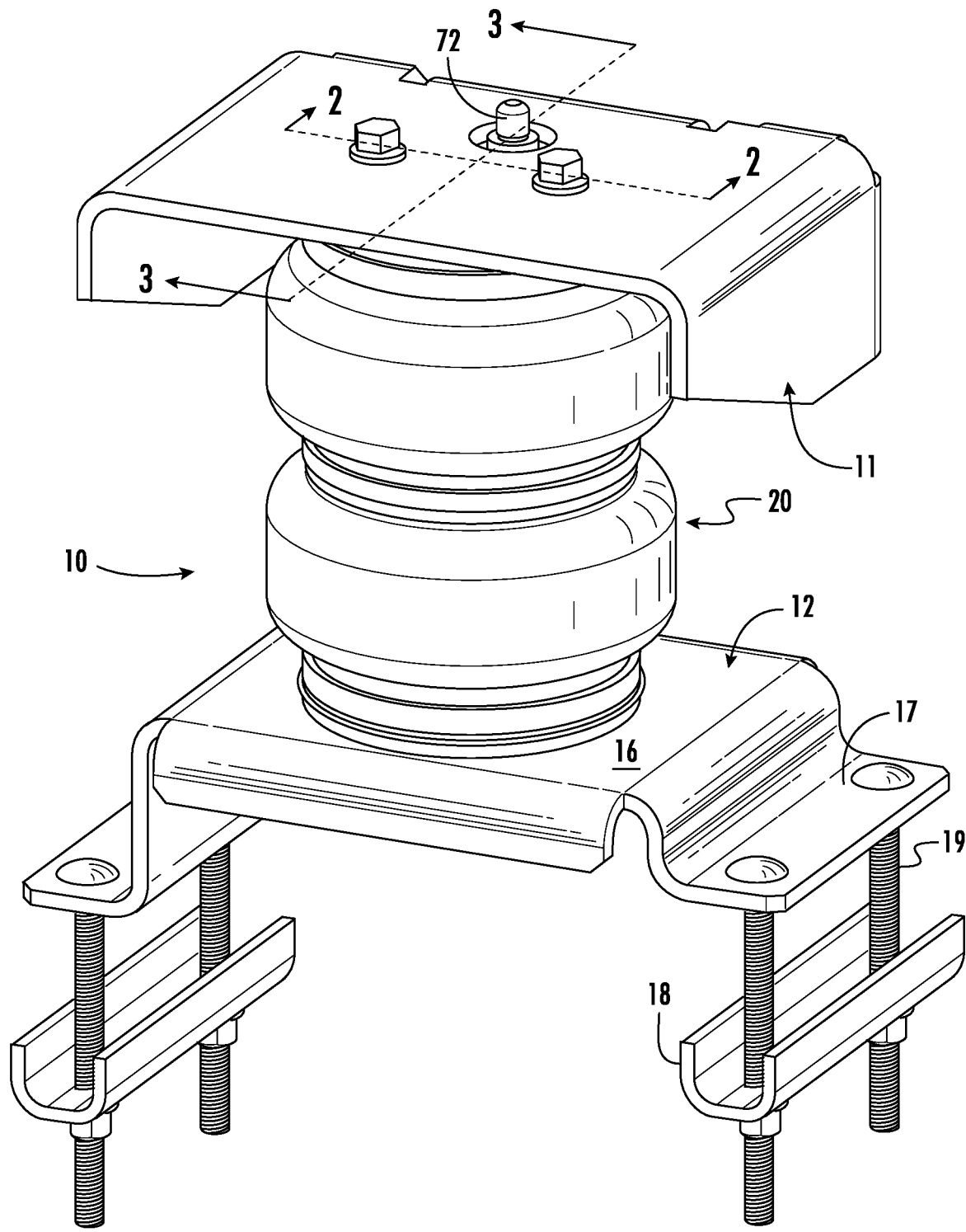
FIG. 1 is a perspective view of the suspension unit prior to assembly on a vehicle.

With reference to FIG. 1, the suspension unit 10 has mounting bracket 11 that is configured for attachment to a given vehicle and a mounting bracket 12 that is configured for attachment to an existing vehicle suspension part. The bellows 20 can be expanded to increase the distance between the brackets 11 and 12, or it can be in a neutral position until a load is placed on the vehicle's suspension system.

The bellows 20 will be described in detail with reference to the section in FIG. 2. The first plate 24 and the second plate 42 will be described hereinafter as the upper plate and the lower plate respectively for ease of description. It will be understood that the suspension unit can be inverted without any loss of efficiency and the attachment of bracket 11 or 12 will determine the position of use. Each plate 11 and 12 has apertures 26 and 43 for receiving fasteners associated with a mounting bracket.

The bellows 20 has two portions 21 with the same diameter and a mid-portion 22 with a lesser diameter, in the manner of an hour glass. The bellows 21 has end portions 25 and 42 that also have reduced diameters that are dimensioned to be inserted in the circumferential grooves 50 and 52 and be retained by the bands 27 and 41. The mid-portion 22 includes a band 23 that secures the reduced diameter, and the band 23 is preferably molded in the bellows as illustrated in FIG. 2.

Figure 2:
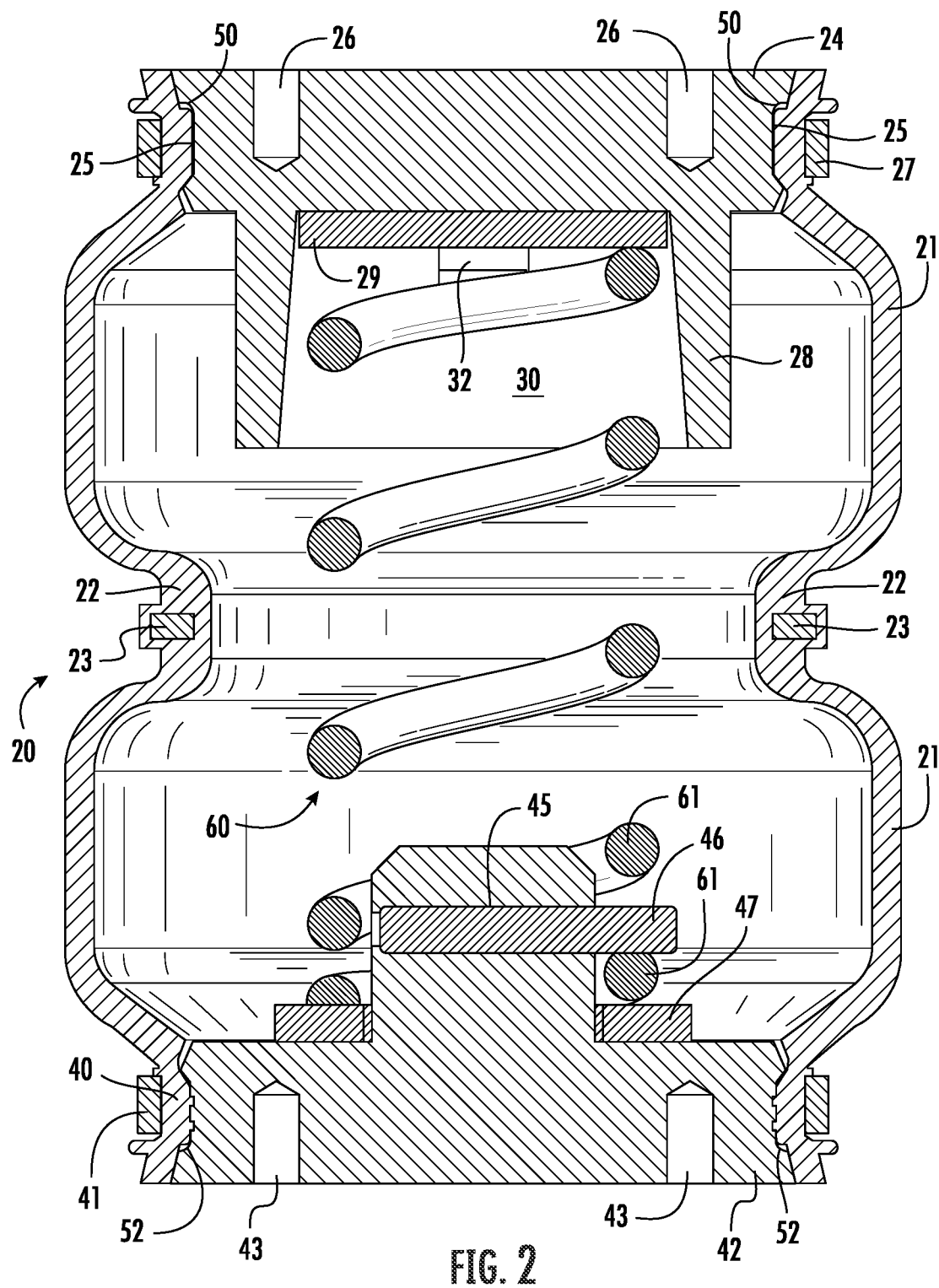
FIG. 2 is a section view along the line 2-2 in FIG. 1.
Figure 3:
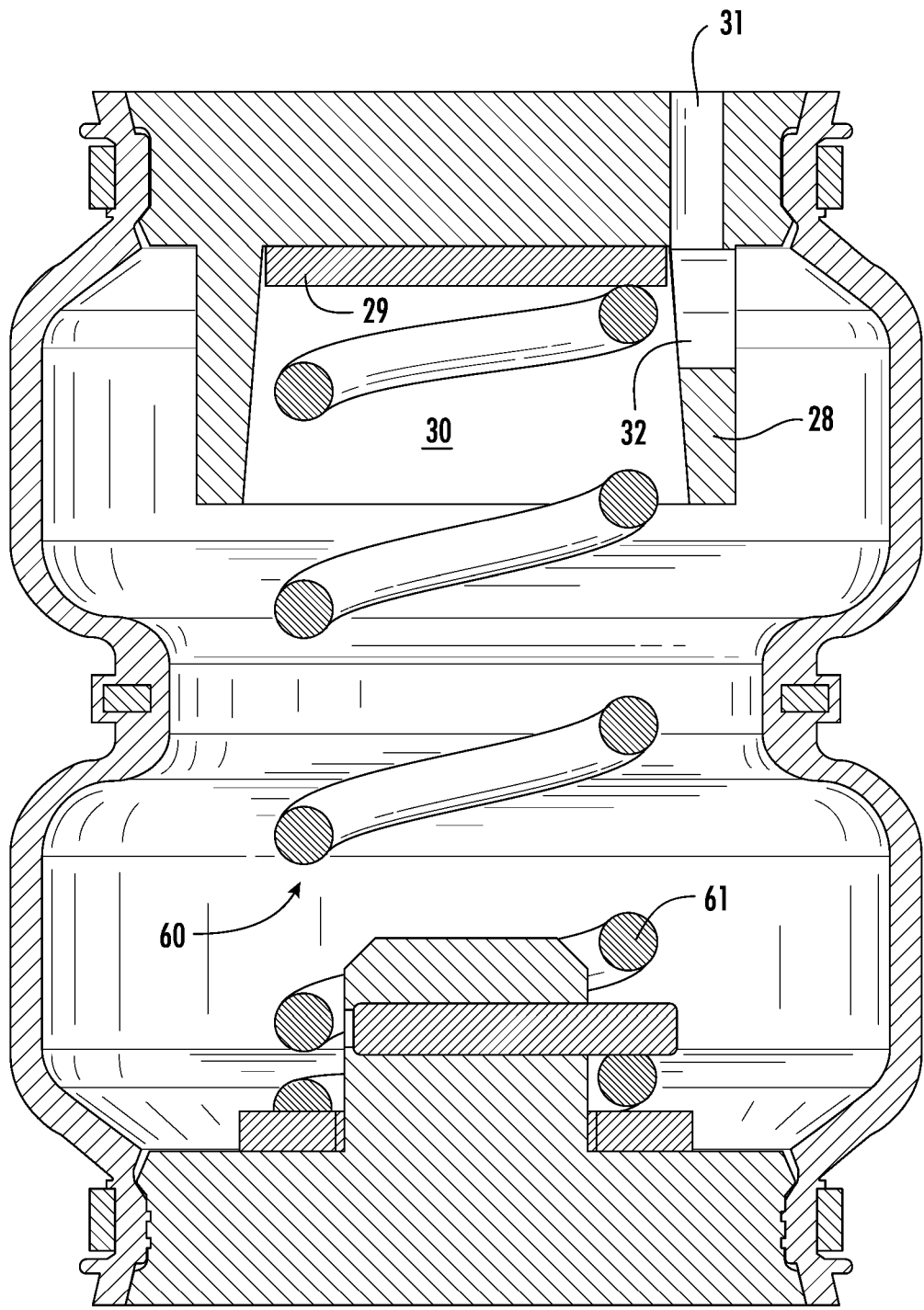
FIG. 3 is a section view along the 3-3 in FIG. 1.

Referring now to FIGS. 2 and 3, the upper plate 24 has a circular dependent wall 28 that creates a recess 30 that receives one end of a biasing element, like spring 60. The upper plater 24 also has an aperture 31 that extends through plate 24 and into the dependent wall 28 at 32 to form a connection point for an inflation and deflation port. A pad 29 is located in the recess 30 between the lower surface of upper plate 24 and spring 60. The pad 29 serves as an isolation pad to absorb noises and to stabilize the spring 60 in the recess 30.

Still with reference to FIGS. 2 and 3, the upper surface of lower plate 42 has a projection 44 that is axially aligned with the recess 30, The projection 44 has and outer diameter that selected to fit within the spring 60 and the length is selected to extend for a sufficient distance to create the bore or aperture 45 that receives the retaining pin 46, which passes between two coils 61 of the spring 60. A pad 47 is located around the projection 44 and between the upper surface of lower plate 24 and spring 60. Like the pad 29, pad 47 serves as an isolation pad to absorb noises and to stabilize the spring 60 in the around the project 44.

Figure 4:
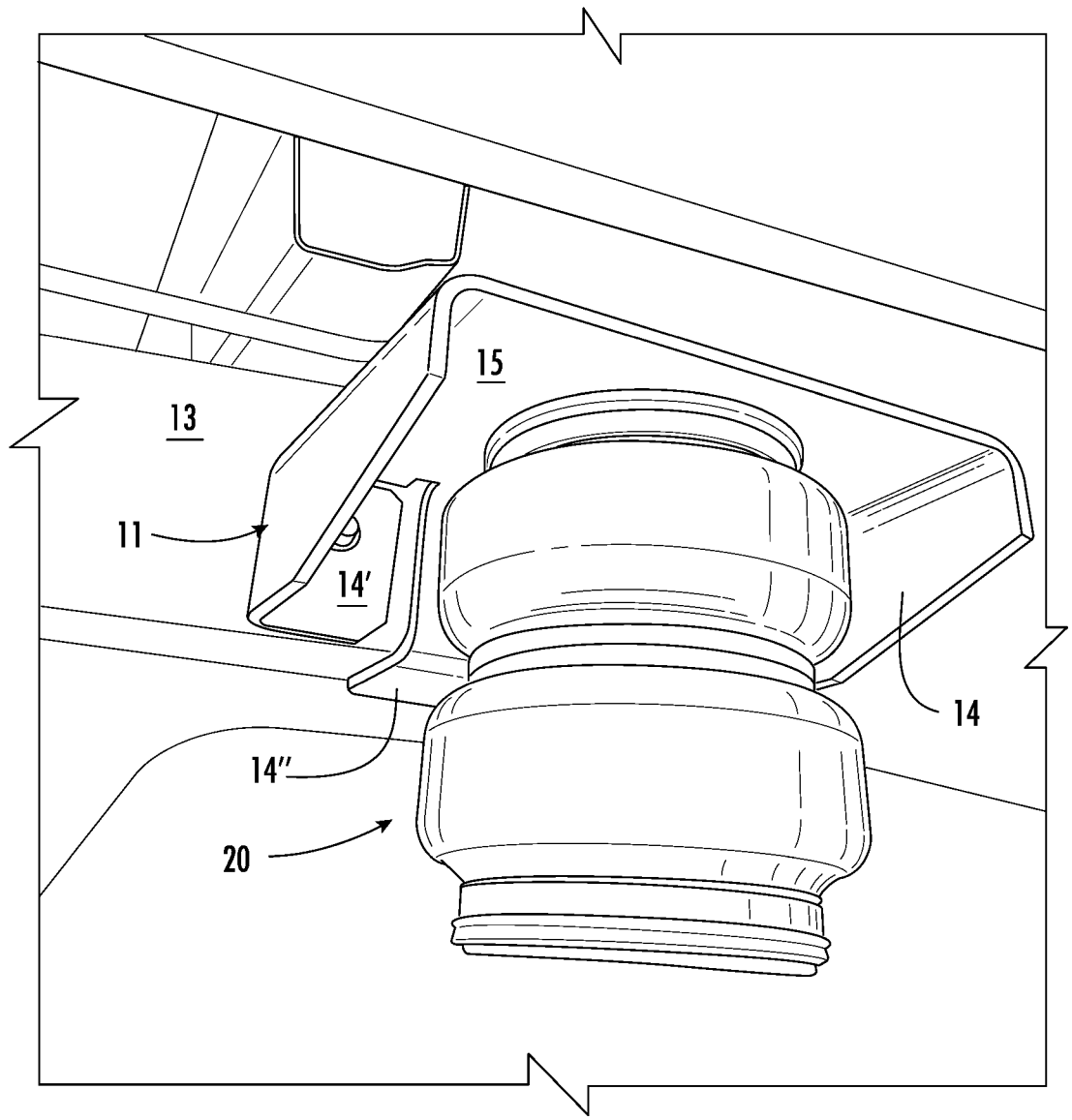
FIG. 4 illustrates a mounting of the suspension unit on a vehicle frame.
Figure 8:
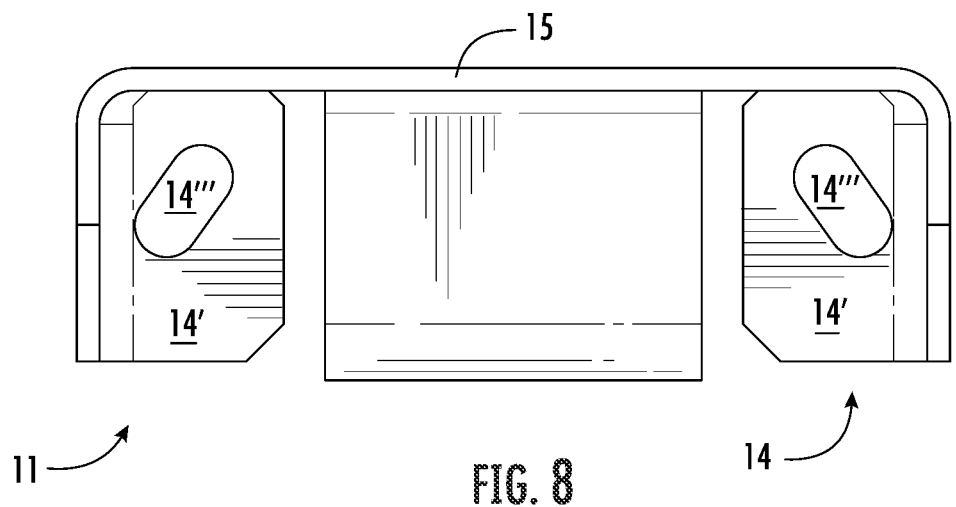
FIG. 8 is a front view of the upper mount for the suspension unit.
Figure 9:
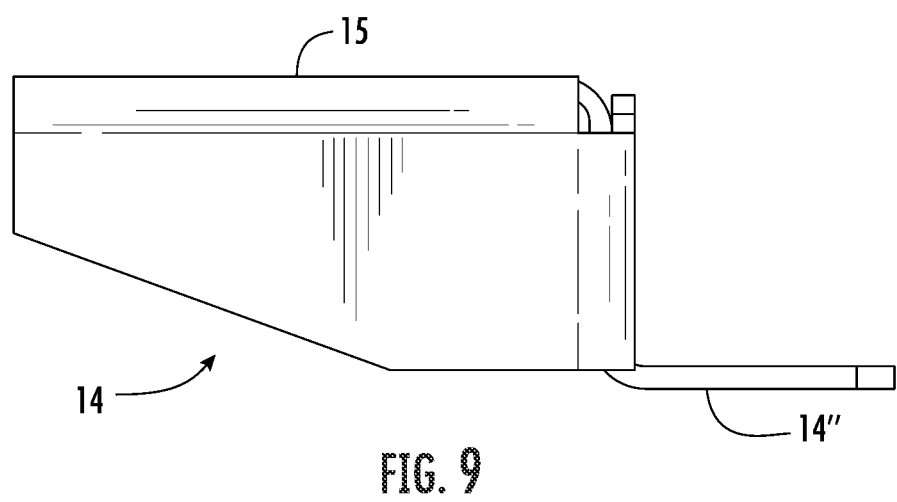
FIG. 9 is a side view of the upper mount for the suspension unit.

FIGS. 4, 8, and 9 illustrate the connection of the mounting plate 11 to a vehicle frame member 13. Mounting plate 11 has a generally horizontal portion 15 that is configured for attachment to the upper plate 24 of the bellows 20, and a generally vertical portion 14 includes at least two portions 14' for connection to the fame 13, either by bolting or welding, and a central portion 14" of the vertical portion 13 is formed to extend beneath the frame 13. The slots 14''' provide access for bolting the mount 11 to the fame 13.

Figure 5:
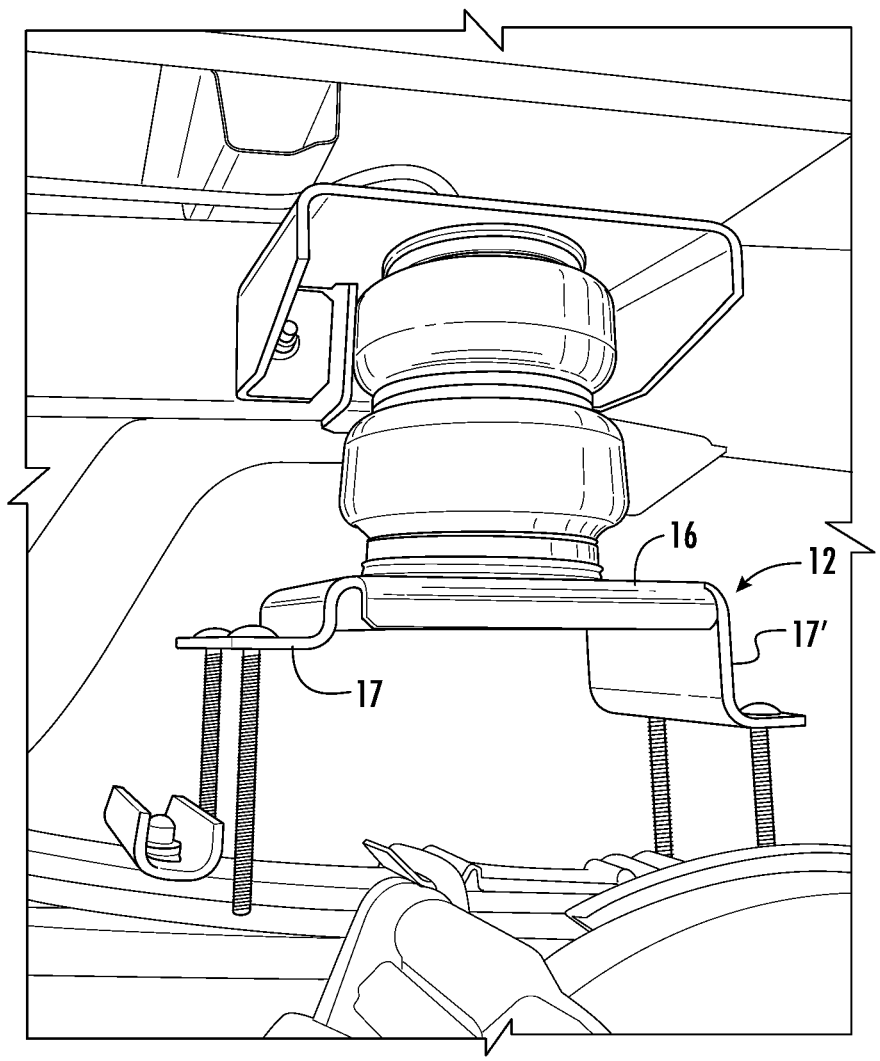
FIG. 5 illustrates the suspension unit mounted on a vehicle frame and above an existing vehicle suspension member.
Figure 6:
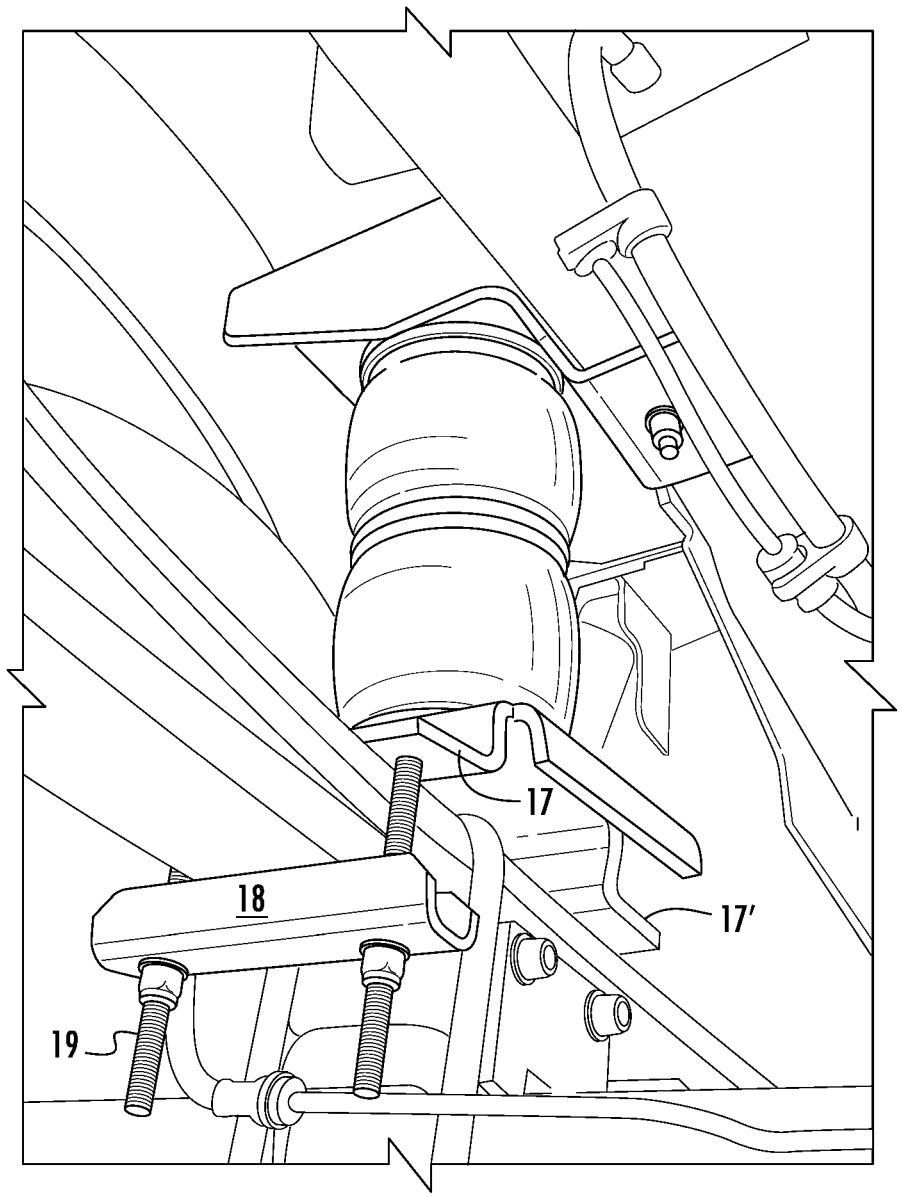
FIG. 6 illustrates a suspension unit fully mounted to the vehicle frame and an existing vehicle suspension member.
Figure 7:
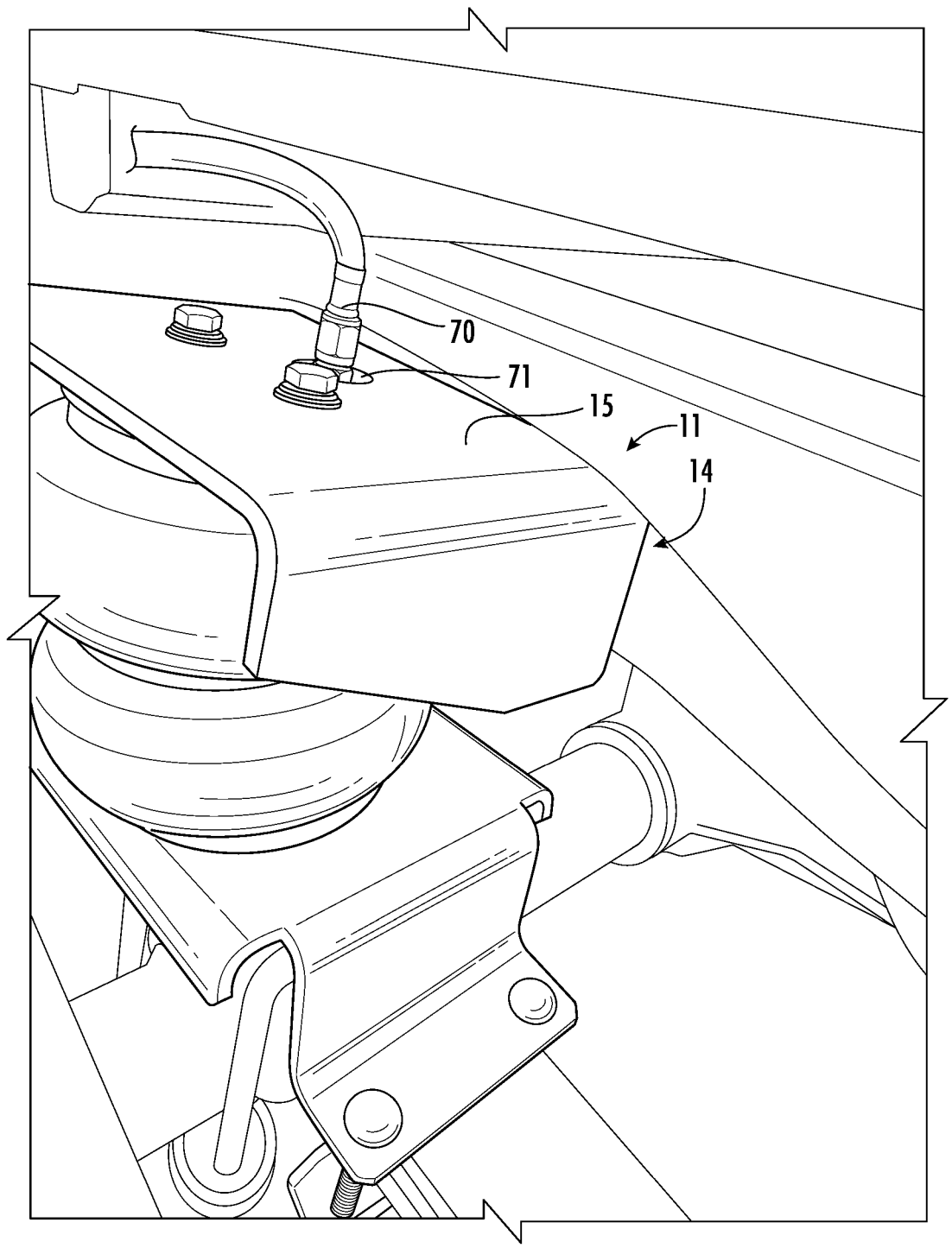
FIG. 7 illustrates the connection for inflating and deflating the bellows of the suspension unit.

FIG. 5 illustrates the lower plate 42 of bellows 20 connected to the planar surface 16 of mounting plate 12. The mounting plate 12, in this embodiment, has flanges 17 and 17' which are configured according to an existing suspension element to provide the assembly with vertical alignment. In the application of the suspension unit to the illustrated leaf spring assembly, the bow configuration of the leaf spring results in a relatively flat surface over the axial and an upward bend from the axial to the chassis mounting, see FIGS. 5-7. As illustrated in FIGS. 6 and 7, the bolt saddles 18 are position under the leaf spring and secured with the bolts 19.

The upper mount 11 and the lower mount 12 may be varied according to the specific application with the controlling condition being that the present suspension unit is mounted with a center line that passes through the existing suspension mount and is generally perpendicular to the exist axial, see FIG. 6.

With reference to FIG. 7, the preferred embodiment has an inflation line 70 that passes through the hole 71 in the generally horizontal portion 15 of mounting plate 11 and connects with the aperture 31 in plate 24, see FIG. 3. The opposite end, not show is connected to an inflation source, such as compressed air, through a Schrader valve or Presta valve 72 (see FIG. 1), for inflation and deflation of the bellows 20.

We claim:

1. An adjustable suspension device comprising:
   a first plate that has an upper surface and a lower surface with a downwardly dependent circular wall that defines an axial recess;
   a second plate that is spaced a predetermined distance from the first plate, the second plate has a lower surface and an upper surface with a projection that extends toward and is aligned with the recess of the first plate;
   a compression spring has a first end received within the axial recess of the first plate and a second end received over the projection of the second plate;
   an inflatable bellows that extends between the first plate and the second plate and encases the compression spring in an interior chamber;
   an aperture in the first plate extends through the first plate and into the downwardly dependent circular wall; and,
   a port connected to the first plate permits ingress and/or egress of a fluid through the first plate and the downwardly dependent circular wall into the inflatable bellows.

2. The adjustable suspension device of claim 1, wherein each of the first plate and the second plate has a circumferential outer groove and the inflatable bellows is attached to a respective plate by a compression ring that urges the inflatable bellows into a respective outer groove.

3. The adjustable suspension device of claim 1, wherein the projection has an aperture and a pin located in the aperture retains the compression spring around the projection.

4. The adjustable suspension device of claim 3, wherein each of the first plate and the second plate has a circumferential outer groove and the inflatable bellows is attached to a respective plate by a compression ring that urges the inflatable bellows into a respective outer groove.

5. The adjustable suspension device of claim 4, wherein the inflatable bellows has a middle portion with a reduced diameter and a stabilizing ring.

6. The adjustable suspension device of claim 5, wherein the stabilizing ring is molded in the middle portion with a reduced diameter.

7. The adjustable suspension device of claim 1, wherein an isolation pad is positioned between the compression spring and both of the first plate and the second plate.

8. The adjustable suspension device of claim 1, wherein each of the first plate and the second plate has a circumferential outer groove and the inflatable bellows is attached to a respective plate by a compression ring that urges the inflatable bellows into a respective outer groove.

9. The adjustable suspension device of claim 1, wherein the projection has an aperture and a pin in the aperture of the projection retains the compression spring around the projection.

10. The adjustable suspension device of claim 9, wherein each of the first plate and the second plate has a circumferential outer groove and the inflatable bellows is attached to a respective plate by a compression ring that urges the inflatable bellows into a respective outer groove.

11. The adjustable suspension device of claim 10, wherein the inflatable bellows has a middle portion with a reduced diameter and an outer groove that includes a stabilizing ring.

12. The adjustable suspension device of claim 11, wherein an isolation pad is positioned between the compression spring and both of the first plate and the second plate.

13. The adjustable suspension device of claim 1, wherein each of the first plate and the second plate has a plurality of apertures that are dimensioned to receive fasteners and secure a mounting plate to each of the first plate and the second plate.

14. An adjustable suspension device comprising:
    a first plate that includes a downwardly dependent circular wall that defines an axial recess beneath the first plate;
    a second plate that is spaced a predetermined distance from the first plate and includes an axial projection that extends from the second plate toward the axial recess and is aligned with the axial recess;
    a compressible element that fits within the axial recess and around the axial projection;
    an inflatable bellows that extends between the first plate and the second plate and encases the compressible element in an interior chamber;
    an aperture in the first plate extends through the first plate into the downwardly dependent circular wall; and,
    a port connected to the first plate permits ingress and/or egress of a fluid through the first plate and the downwardly dependent circular wall into the inflatable bellows.

15. A kit for providing a vehicle with a redundant suspension device, the kit comprising:
    an inflatable bellows having:
    a first plate with a downwardly dependent circular wall that defines an axial recess beneath the first plate;
    a second plate that is spaced a predetermined distance from the first plate and includes a projection that extends from the second plate toward the axial recess and is aligned with the axial recess;
    a load bearing element that fits within the recess and around the projection;
    an inflatable bellows that extends between the first plate and the second plate and encases the load bearing element in an interior chamber;
    an aperture in the first plate extends through the first plate and into the downwardly dependent circular wall; and,
    a port connected to the first plate permits ingress and/or egress of a fluid through the first plate and the downwardly dependent circular wall into the inflatable bellows;
    a first mount configured for attachment to a vehicle frame member and one of the first plate or the second plate of the inflatable bellows; and, a second mount configured for attachment to a vehicle suspension member and another of the first plate or the second plate.

16. The kit of claim 15, wherein each of the first plate and the second plate has at least one circumferential outer groove and the inflatable bellows is attached to a respective plate by a compression ring that urges the inflatable bellows into a respective outer groove.

17. The kit of claim 16, wherein the inflatable bellows has a middle portion with a reduced diameter and a stabilizing ring.

18. The kit of claim 15, wherein the projection has an aperture and a pin in the aperture retains the load bearing element around the projection.

19. The kit of claim 15, wherein the load bearing element is a spring.

20. The kit of claim 15, wherein the ingress and/or egress of a fluid within the interior chamber passes through a Schrader valve and/or a Presta valve.

21. The kit of claim 15, wherein the first mount includes a first portion that attaches to a first surface of the frame member and a second portion that contacts a second surface of the frame member.

22. The kit of claim 21, wherein the first portion and the second portion are in perpendicular planes.

* * * * *